United States Patent
Makita et al.

(10) Patent No.: US 8,318,367 B2
(45) Date of Patent: Nov. 27, 2012

(54) ELECTROCHEMICAL ENERGY GENERATING APPARATUS AND OPERATING METHOD THEREOF, AND ELECTROCHEMICAL DEVICE

(75) Inventors: Kengo Makita, Kanagawa (JP); Takashi Tomita, Kanagawa (JP)

(73) Assignee: Sony Corporation, Tokyo (JP)

( * ) Notice: Subject to any disclaimer, the term of this patent is extended or adjusted under 35 U.S.C. 154(b) by 711 days.

(21) Appl. No.: 12/092,650

(22) PCT Filed: Nov. 2, 2006

(86) PCT No.: PCT/JP2006/321970
§ 371 (c)(1),
(2), (4) Date: May 5, 2008

(87) PCT Pub. No.: WO2007/052744
PCT Pub. Date: May 10, 2007

(65) Prior Publication Data
US 2010/0316920 A1    Dec. 16, 2010

(30) Foreign Application Priority Data
Nov. 4, 2005    (JP) .................. 2005-320510

(51) Int. Cl.
*H01M 8/04*    (2006.01)
(52) U.S. Cl. .................. 429/432; 429/430; 429/431
(58) Field of Classification Search .................. 429/430, 429/431, 432
See application file for complete search history.

(56) References Cited

U.S. PATENT DOCUMENTS

| | | | | |
|---|---|---|---|---|
| 5,712,052 A | * | 1/1998 | Kawatsu | .................. 429/412 |
| 2002/0187374 A1 | | 12/2002 | Yamauchi et al. | |
| 2004/0137292 A1 | * | 7/2004 | Takebe et al. | .................. 429/23 |
| 2005/0037248 A1 | | 2/2005 | Sudo | |
| 2005/0208349 A1 | * | 9/2005 | Inai et al. | .................. 429/13 |

FOREIGN PATENT DOCUMENTS

| | | |
|---|---|---|
| JP | 2001-338667 | 12/2001 |
| JP | 2003-22830 | 1/2003 |
| JP | 3451111 | 7/2003 |
| JP | 2003-287514 | * 10/2003 |
| JP | 2004-327354 | 11/2004 |
| WO | 03-096461 | 11/2003 |

OTHER PUBLICATIONS

Gurau et al., "Methanol crossover in direct methanol fuel cells: a link between power and energy density," Journal of Power Sources, 112, (2002), pp. 39-352.
Japanese Office Action issued on Feb. 14, 2012, for corresponding Japanese Patent Application 2005-320510.

* cited by examiner

*Primary Examiner* — Eugenia Wang
(74) *Attorney, Agent, or Firm* — K&L Gates LLP

(57) ABSTRACT

An electrochemical energy generation device includes an electrochemical device such as a fuel cell having an electrolyte film arranged between an anode and a cathode and a reference electrode maintained at an oxidation-reduction potential between an metal and a metal ion and arranged in contact with the electrolyte film. The electrochemical energy generation device is operated by measuring a potential of the anode and the cathode based on the reference electrode, deciding the operation condition such as a fuel supply amount to the electrochemical device according to the result of the potential measurement of the anode and the cathode, and selling the operation condition such as the fuel supply amount according to the decision, by an operation condition setting unit. An operation method of the device and an electrochemical device constituting the device are also provided.

13 Claims, 9 Drawing Sheets

ELECTROCHEMICAL ENERGY GENERATING APPARATUS AND OPERATING METHOD THEREOF, AND ELECTROCHEMICAL DEVICE

CROSS REFERENCE TO RELATED APPLICATIONS

The present application is a national stage of International Application No. PCT/JP2006/321970 filed on Nov. 2, 2006 and claims priority to Japanese Patent Application No. 2005-320510 filed on Nov. 4, 2005, the disclosure of which is incorporated herein by reference.

BACKGROUND

The present invention relates to an electrochemical energy generating apparatus and an operating method thereof, and an electrochemical device forming the apparatus.

There are energy density and power density as quantities indicating characteristics of a cell. Energy density is an energy storage quantity per unit mass of the cell, and power density is a power quantity per unit mass of the cell. A lithium-ion secondary battery is often used as a power source for mobile devices because the lithium-ion secondary battery combines two features of a relatively high energy density and a very high power density, and also has reached a high degree of perfection. Recently, however, as the functionality of the mobile device has become higher, power consumption of the mobile device has tended to be increased, so that the lithium-ion secondary battery is desired to be further improved in energy density and power density.

Solutions to this would include the changing of electrode materials for a positive electrode/negative electrode, improvements in a method of coating electrode materials, improvements in a method of sealing in electrode materials, and the like, and research is being conducted to improve the energy density of the lithium-ion secondary battery. However, there are still high hurdles to clear for practical use. In addition, unless component materials used in the present lithium-ion secondary battery are changed, substantial improvements in energy density cannot be expected.

Thus, it is urgently necessary to develop a battery having higher energy density in place of the lithium-ion secondary battery, and a fuel cell is considered to be promising as one of candidates for a battery having higher energy density.

The fuel cell includes an anode electrode and a cathode electrode. A fuel is supplied to the anode electrode side, and an air or oxygen is supplied to the cathode electrode side. As a result, an oxidation-reduction reaction in which the fuel is oxidized by oxygen occurs on the anode electrode and the cathode electrode, and a part of chemical energy possessed by the fuel is converted into electric energy, which is then extracted.

Various kinds of fuel cells have already been proposed and produced on a trial basis, and a part of the various kinds of fuel cells have already been manufactured and put to practical use. According to an electrolyte used, these fuel cells are classified into alkaline fuel cells (AFCs), phosphoric acid fuel cells (PAFCs), molten carbonate fuel cells (MCFCs), solid oxide fuel cells (SOFCs), polymer electrolyte fuel cells (PEFCs), and the like. Of the polymer electrolyte fuel cells (PEFCs), direct methanol fuel cells (DMFCs), in which methanol as a fuel is directly supplied to an anode, are most likely to be used as an energy source for mobile devices, electric vehicles and the like among various fuel cells.

In a DMFC, a fuel of methanol is generally supplied as an aqueous solution of low concentration or high concentration to an anode side, and oxidized to carbon dioxide in a catalyst layer on the anode side. Protons generated at this time travel through an electrolyte membrane separating an anode and a cathode to the cathode, and then react with oxygen to form water on the cathode side. Reactions occurring at the anode, the cathode, and the DMFC as a whole are each expressed by the following equation.

Anode: $CH_3OH+H_2O \rightarrow CO_2+6e^-+6H^+$

Cathode: $(3/2)O_2+6e^-+6H^+ \rightarrow 3H_2O$

DMFC as a whole: $CH_3OH+(3/2)O_2 \rightarrow CO_2+2H_2O$

The energy density of methanol as the fuel of the DMFC is theoretically 4.8 kW/L, which is 10 times higher than the energy density of the lithium-ion secondary battery. That is, the fuel cell using methanol as a fuel has a potential to surpass the lithium-ion secondary battery in energy density. In addition, the DMFC eliminates a need for a reformer for extracting hydrogen from a fuel, and thus has an advantage of having a simple constitution. Further, polymer electrolyte fuel cells (PEFCs) such as the DMFC have an advantage of being able to operate at a lower temperature of 30° C. to 130° C. than other fuel cells.

However, the DMFC has a problem in that though theoretical voltage is 1.23 V, output voltage when power is actually generated by the DMFC is lowered to about 0.6 V or lower. A cause of the lowering of the output voltage is a voltage drop caused by internal resistances of the DMFC. Inside the DMFC, there are internal resistances such as a resistance involved in reactions occurring at both electrodes, a resistance involved in movement of substances, a resistance occurring when protons travel through the electrolyte membrane, a contact resistance, and the like. Energy that can be actually derived as electric energy from the oxidation of methanol is expressed by a product of the output voltage at the time of power generation and a quantity of electricity flowing through a circuit. Thus, when the output voltage at the time of power generation is lowered, the energy that can be actually derived is correspondingly decreased. Incidentally, the quantity of electricity that can be taken out to the circuit by the oxidation of methanol is proportional to a quantity of methanol within the DMFC when the whole quantity of methanol is oxidized at the anode according to the above-described equation.

The DMFC has another problem of methanol crossover. Methanol crossover is a phenomenon in which methanol passes through the electrolyte membrane from the anode side and reaches the cathode side due to two mechanisms of a phenomenon in which methanol is diffused and moved by a difference in methanol concentration between the anode side and the cathode side and an electroosmotic phenomenon in which hydrated methanol is carried by the movement of water, which is caused with the movement of protons.

When methanol crossover occurs, methanol that has passed through is oxidized on a catalyst on the cathode side. The methanol oxidation reaction on the cathode side is the same as the oxidation reaction on the anode side as described above, but causes a decrease in the output voltage of the DMFC (see "Fuel Cell Systems Explained", Ohmsha, Ltd., p. 66). In addition, because methanol is not used for power generation on the anode side but is consumed on the cathode side, the quantity of electricity that can be taken out to the circuit is correspondingly reduced. Furthermore, because the catalyst on the cathode side is not a Pt—Ru alloy catalyst, but is a Pt catalyst, CO tends to be adsorbed on the surface of the catalyst, and catalyst poisoning occurs, for example.

As described above, the DMFC has two problems of a decrease in voltage, which decrease is caused by the internal resistance and methanol crossover, and consumption of fuel as a result of methanol crossover. These problems are a cause of a decrease in power generation efficiency of the DMFC. Accordingly, research and development for improving characteristics of materials forming the DMFC and research and development for optimizing operating conditions of the DMFC are being conducted to enhance the power generation efficiency of the DMFC.

In the research for improving characteristics of materials forming the DMFC, research into reducing methanol crossover, in particular, is actively pursued.

A method of using up all of methanol that has been supplied on the anode side, for example, is conceivable as a method for reducing methanol crossover. For this, it is necessary to improve catalytic activity per unit quantity on the anode side or increase a catalyst support quantity on the anode side. However, while research and development of new catalysts is being conducted, it is at present difficult to improve the activity of a Pt—Ru base catalyst generally used as a catalyst on the anode side, and an ideal catalyst having higher catalytic performance than that of the Pt—Ru base catalyst has not been found either. While increasing the catalyst support quantity can improve a rate of oxidation of methanol at the anode to a certain degree, increasing the catalyst raises the internal resistance, thus resulting in an adverse effect of lowering the output voltage.

In addition, research into electrolyte membranes that can minimize methanol crossover is actively pursued. However, a polyperfluoroalkylsulfonic acid base resin membrane (for example a Nafion (registered trademark) membrane), which is generally used as an electrolyte membrane for the DMFC, has an advantage of high proton conductivity, but has low capability to obstruct the penetration of methanol. Thus, high proton conductivity and high capability to obstruct the penetration of methanol tend to run counter to each other. An ideal catalyst has not yet been found, and an optimum electrolyte membrane has not yet been found either.

On the other hand, research and development is being conducted to improve the power generation characteristic of the DMFC by controlling operating conditions as another method than the improvement of characteristics of component materials. For example, Reference Document 1 (Journal of Power Sources, 112, 339 to 352 (2002)) has a description showing that the power density and power generation efficiency of the DMFC vary depending mainly on operating temperature, a fuel supply quantity, fuel concentration and the like, and describes changes in characteristics of the fuel cell when these operating conditions are changed.

In this Reference Document 1 (Journal of Power Sources, 112), data on the characteristics of the fuel cell in different operating conditions is collected with the temperature set at 40° C., 60° C., and 80° C., the fuel supply flow rate set at 0.15 mL/min, 0.5 mL/min, and 5 mL/min, and the fuel concentration set at 2 mol/L, 1 mol/L, and 0.5 mol/L. A result shows that a maximum power density is obtained when the fuel cell is made to generate power under operating conditions where the fuel cell is operated at 80° C., and the fuel concentration is set at the minimum of 0.5 mol/L and the fuel supply flow rate is set at the maximum of 5 mL/min. In addition, it is also described a fact that under the above operating conditions, the power density is high, but the power generation efficiency becomes poor because the methanol crossover is increased. It is also described a fact that even when the same output is obtained, the power generation efficiency varies greatly depending on operating conditions.

Accordingly, a method is conceivable which creates a database in advance in which operating conditions that increase the power generation efficiency are determined after the characteristics of the fuel cell are measured while finely changing parameters such as the temperature, the fuel supply flow rate, the fuel concentration, and the like, and sets operating conditions of the fuel cell on the basis of the database.

In addition, as a method for optimizing the operating conditions, Reference Document 2 (Japanese Patent Laid-Open No. 2003-22830) proposes a method in which fuel flow rate control means for controlling the quantity of the fuel supplied from a fuel tank according to the concentration of the fuel is used to improve the performance of the fuel cell. At this time, the internal model of the DMFC is represented by a mathematical formula, and thereby power generation conditions are expressed in the form of a formula to determine the operating conditions.

However, the method which creates a database and performs control on the basis of the database has a disadvantage in that there are too many parameters affecting the power generation efficiency of the DMFC and thus the measurement takes time. The method has another disadvantage in that the amount of measurement data becomes enormous, and thus a control program is also increased in size.

Further, it is known that the internal characteristics of the fuel cell change due to CO poisoning occurring at the anode side catalyst, flooding occurring at the cathode, degradation of the electrolyte membrane, and the like. When power is actually generated by using the DMFC, it is assumed that the DMFC is used for at least a few months to one year or more. Meanwhile, the internal characteristics of the fuel cell change inevitably, and operating conditions that maximize the power generation efficiency of the DMFC change from moment to moment.

Methods as described in Patent Document 1 (Japanese Patent No. 3451111 (pages 3 to 5, FIGS. 1 to 8)) and Patent Document 2 (Japanese Patent Laid-Open No. 2001-338667 (pages 4 to 6, FIGS. 1 to 3)) determine operating conditions on the basis of data measured in advance or a mathematical formula created in advance, and thus does not take changes in the internal characteristics of the fuel cell into consideration and cannot deal with the changes in the internal characteristics. The control methods that make the DMFC generate power under the operating conditions derived from the rule thus determined in advance does not provide the power generation characteristic as expected during the actual operation of the DMFC, and cannot make the DMFC continue generating power under the operating conditions where the power generation efficiency is high for a long period of time. As a result, electric energy cannot be derived from methanol efficiently. Even when methanol having high energy density is used, the advantages of methanol cannot be utilized. Thus, only an energy density equal to or lower than that of the lithium-ion secondary battery is obtained.

In order to solve such a problem, Patent Document 1 (Japanese Patent No. 3451111) and Patent Document 2 (Japanese Patent Laid-Open No. 2001-338667) have proposed a method for controlling the fuel cell which method uses, for control, a reference electrode that has conventionally been used for purposes of studying causes of degradation in performance of the fuel cell and degradation mechanisms.

Patent Document 1 (Japanese Patent No. 3451111) proposes a control method for properly maintaining the water-retaining states of a polymer electrolyte membrane and electrodes, which method detects the potentials of an anode and a cathode using a reference electrode, determines whether water content inside the fuel cell is high or low on the basis of the potentials, and adjusts the flow rates of a hydrogen containing gas and an oxygen containing gas supplied to the anode and the cathode and amounts of humidification of these gases.

Patent Document 2 (Japanese Patent Laid-Open No. 2001-338667) proposes a fuel cell control system that has a reference electrode formed by a reversible hydrogen electrode in the vicinity of an end part of at least one of a fuel electrode and an air electrode that are disposed on both sides of an electrolyte, detects a potential difference between the reference electrode and the fuel electrode or a potential difference between the reference electrode and the air electrode, quickly determines an operating parameter indicating highest energy conversion efficiency on the basis of a resulting detection signal, and operates the fuel cell in optimum conditions at all times.

SUMMARY

The fuel cell according to Patent Document 2 (Japanese Patent Laid-Open No. 2001-338667) supplies a hydrogen gas to the reversible hydrogen electrode forming the reference electrode, and therefore has piping for supplying and exhausting the hydrogen gas, which piping is separate from a fuel supply path of the fuel cell, a hydrogen gas source, and the like. Therefore, the reference electrode can be expected to indicate a stable reference potential. However, the device becomes large and complex, control and management for supply and exhaustion of the hydrogen gas requires much time and labor, and cost is increased. Therefore the control system according to Patent Document 2 (Japanese Patent Laid-Open No. 2001-338667) cannot be applied to a small fuel cell for use in a mobile device, for example.

On the other hand, in a polymer electrolyte fuel cell according to Patent Document 1 (Japanese Patent No. 3451111), a system for supplying a gas to a gas diffusion electrode forming a reference electrode is omitted, and only the gas diffusion electrode is provided to a hydrogen gas supply path, which is a fuel supply path of the fuel cell. A fuel gas supplied to the fuel cell is used as a gas to be supplied to the gas diffusion electrode. Thus, the device becomes simple, time and labor for control and management for supply and exhaustion of the gas for the reference electrode is not required, and cost is decreased. However, the potential of the reference electrode is affected by the concentration of the fuel supplied to the fuel cell. In the case of a direct type fuel cell in particular, which directly supplies an oxygen containing fuel other than hydrogen, for example methanol as a fuel to an anode, the oxidation of the fuel involves complex chemical change, and it is thus difficult to consider that the reference electrode indicates a stable reference potential. It is therefore difficult to use this control system as a control system for a direct type fuel cell.

The present invention has been made to solve the above-described problems. It is accordingly an object of the present invention to provide an electrochemical energy generating apparatus that can always provide a high power generation characteristic while responding to changes in internal characteristics of an electrochemical device such as a fuel cell or the like, even though the electrochemical energy generating apparatus is of such a simple configuration as to be able to be incorporated into a mobile device, an operating method thereof, and an electrochemical device forming the apparatus.

That is, the present invention relates to an electrochemical energy generating apparatus including: an electrochemical device unit having an electrolyte disposed between an anode and a cathode; a reference electrode disposed in contact with or in proximity to the electrolyte, the reference electrode being maintained at an oxidation-reduction potential between a metal and a metal ion; a measuring unit for measuring a potential of the anode and/or a potential of the cathode with respect to the reference electrode; a control unit for determining an operating condition of the electrochemical device unit on a basis of a result of measurement of the potential of the anode and/or the potential of the cathode; and a setting unit for setting the operating condition of the electrochemical device unit on a basis of the determination.

The present invention also relates to an operating method of an electrochemical energy generating apparatus, the electrochemical energy generating apparatus including an electrochemical device unit having an electrolyte disposed between an anode and a cathode, and a reference electrode disposed in contact with or in proximity to the electrolyte, the reference electrode being maintained at an oxidation-reduction potential between a metal and a metal ion, the operating method including: a step of measuring a potential of the anode and/or a potential of the cathode with respect to the reference electrode; a step of determining an operating condition of the electrochemical device unit on a basis of a result of measurement of the potential of the anode and/or the potential of the cathode; and a step of setting the operating condition of the electrochemical device unit on a basis of the determination.

The present invention also relates to an electrochemical device including: an electrochemical device unit having an electrolyte disposed between an anode and a cathode; and a reference electrode disposed in contact with or in proximity to the electrolyte, the reference electrode being maintained at an oxidation-reduction potential between a metal and a metal ion; wherein a potential of the anode and/or a potential of the cathode are measured with respect to the reference electrode.

Additional features and advantages of the present invention are described in, and will be apparent from, the following Detailed Description and the Figures.

DETAILED DESCRIPTION

Figure 1:
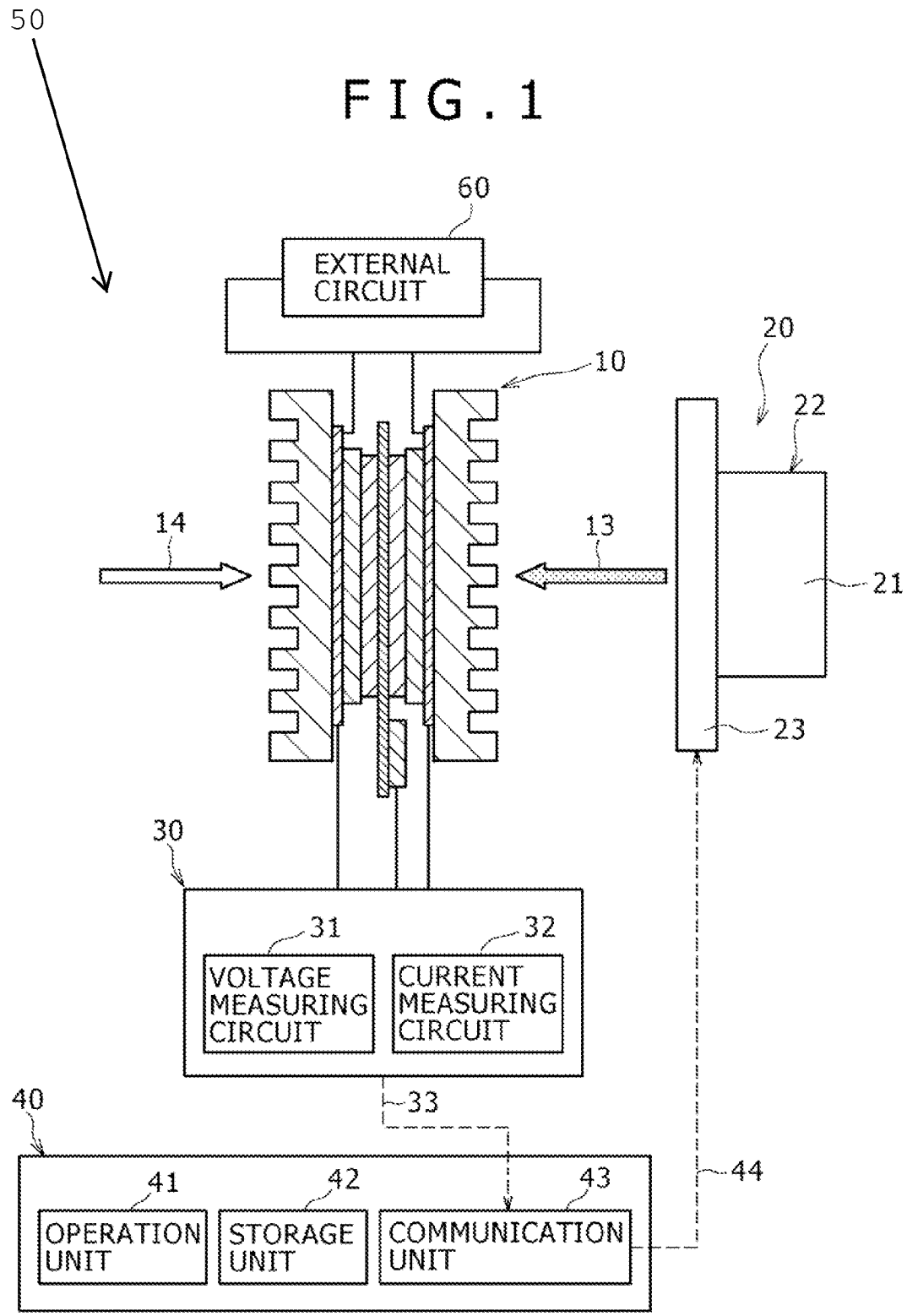
FIG. 1 is a sectional view of a fuel cell forming an electrochemical energy generating apparatus based on an embodiment of the present invention.

An operating method of an electrochemical energy generating apparatus according to the present invention preferably has a step of measuring an output voltage and/or an output current of the electrochemical device unit, wherein the operating condition of the electrochemical device unit is determined on a basis of a combination of a result of measurement of the output voltage and/or the output current and the result of measurement of the potential of the anode and/or the cathode. The result of measurement of the output current is particularly important because the result of measurement of the output current is data indicating an oxidation rate of methanol on the anode. When the measurements of the potentials of the anode and the cathode are made, the output voltage can be calculated from the measurements. Even in this case, the actual measurement of the output voltage is important. This is because the output voltage is a quantity that can be measured easily and accurately, and reliability of the measurements of the potentials of the anode and the cathode can be checked by comparing a value calculated from the measurements of the potentials with an actually measured value.

In addition, preferably, the operating condition of the electrochemical device unit formed as a fuel cell in which a fuel is supplied to the anode and an oxygen containing gas is supplied to the cathode is set.

In addition, preferably, a fuel supply quantity is set as the operating condition of the electrochemical device unit. Objects of control other than the fuel supply quantity include for example an air (oxygen) supply quantity or a reaction temperature. The larger the number of objects of control becomes, the more minutely the operating condition can be controlled. However, equipment, time and effort, and cost required for this are increased. On the other hand, there is not necessarily an effect commensurate with the increases. Hence, a small fuel cell such as a fuel cell for a mobile device or the like preferably performs only control of the fuel supply quantity, which control is most effective, though not particularly limited thereto. This can enhance effect without a loss of simplicity.

At this time, preferably, the setting of the fuel supply quantity is made repeatedly, and a fuel concentration at the anode is optimized so as to follow a variation in characteristics of the fuel cell. As already described, a method of setting in advance a target value of the fuel concentration at the anode and bringing the fuel concentration closer to the target value cannot follow a change in characteristics of the fuel cell, and thus cannot make the fuel cell continue generating power under the operating condition where power generation efficiency is high for a long period of time. Hence, it is desirable to monitor conditions of the anode and the cathode at all times, determine only an excess or a deficiency of the fuel concentration at the anode on the basis of real-time data measured during operation, and set the fuel supply quantity so as to eliminate the excess or the deficiency. Thus, it is possible to optimize the fuel concentration at the anode without using a fuel concentration sensor or the like and so as to follow a variation in characteristics of the fuel cell.

An example in which the electrochemical device unit is formed as a direct methanol fuel cell (DMFC) as an example of an electrochemical energy generating apparatus based on an embodiment of the present invention and an operating method thereof will be described in the following with reference to drawings.

Because the internal characteristics of the DMFC change with time, it is very difficult to operate the DMFC with an optimum power generating characteristic without a control system capable of fine adjustment. Description will first be made of a concept as a centerpiece of a control system necessary to operate the DMFC with a high power generation characteristic.

Figure 12:
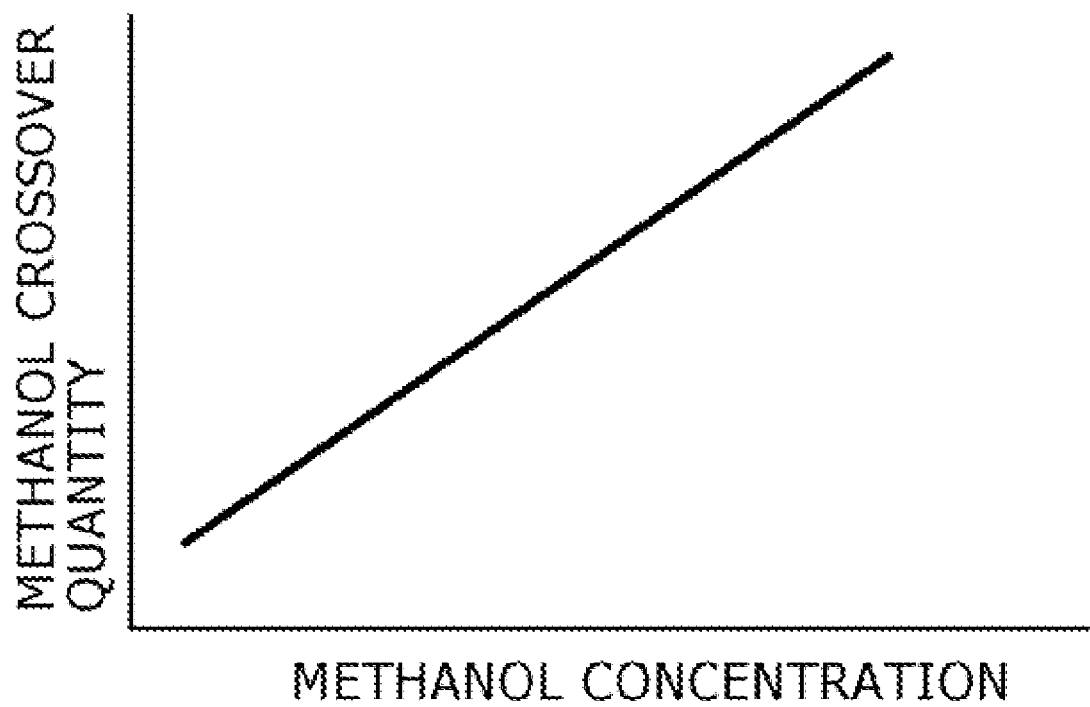
FIG. 12 is a graph showing an effect of methanol concentration at the anode of the embodiment of the present invention on a methanol crossover quantity.

FIG. 12 is a graph showing an effect of methanol concentration at an anode on a methanol crossover quantity. When the methanol concentration and a methanol supply quantity are in proportional relation to each other, the graph of FIG. 12 can also be regarded as a graph showing an effect of the methanol supply quantity at the anode on the methanol crossover quantity. As shown in FIG. 12, as the methanol concentration at the anode becomes higher (the methanol supply quantity is increased), the methanol crossover quantity is increased. It has been confirmed that, therefore, when the methanol concentration at the anode is not an appropriate concentration, the power generation characteristic is greatly degraded by a waste of fuel and a decrease in output voltage due to an increase in crossover (see "Fuel Cells for Mobile Devices", Technical Information Institute Co., Ltd, p. 110).

Accordingly, a method is considered which measures the methanol concentration at the anode using a methanol concentration sensor and controls the supply quantity. However, the methanol sensor is not inexpensive, and requires a substantially large volume when incorporated in the DMFC. Therefore energy density is decreased, so that a feature of the DMFC of having a high energy density cannot be exploited.

In addition, while methanol crossover is a major cause of a degradation in the power generation characteristic of the DMFC, a degradation in the power generation characteristic of the DMFC is caused not only by methanol crossover but also by a deficiency of the fuel supply quantity, a deficiency of an air supply quantity and the like. Because a methanol crossover, a deficiency of the fuel supply quantity, and a deficiency of the air supply quantity each degrade the power generation characteristic, it is not possible to estimate which factor is causing a degradation in the power generation characteristic on the basis of only a normal measurement of the power generation characteristic, for example a measurement of output voltage and/or output current. In addition, there occur during operation a decrease in catalytic activity, a change in electrode reaction area, the hindering of gas diffusion by flooding, and the like, which cause a characteristic change within the DMFC. It is therefore necessary to optimize the power generation characteristic under any operating condition by following a characteristic change within the DMFC at all times. Hence, when the methanol concentration is only controlled to a predetermined value on the basis of a result of measurement by the methanol concentration sensor, it is not possible to respond to these changes in the power generation characteristic of the DMFC flexibly.

The present inventor has determined main causes of degradations in the power generation characteristic of the fuel cell, has found that proper control can be performed under different operating conditions by using a reference electrode, as will be described later using embodiments, and has established a method for solving the above-described problems. Specifically, a reference electrode is provided, an anode potential and a cathode potential are measured with respect to the reference electrode, and proper control is performed on the basis of a change in the anode potential and the cathode potential. It is thereby possible to deal with causes of degradation in performance such as a fuel deficiency, an air deficiency, a methanol crossover and the like under any operating condition.

Figure 2:
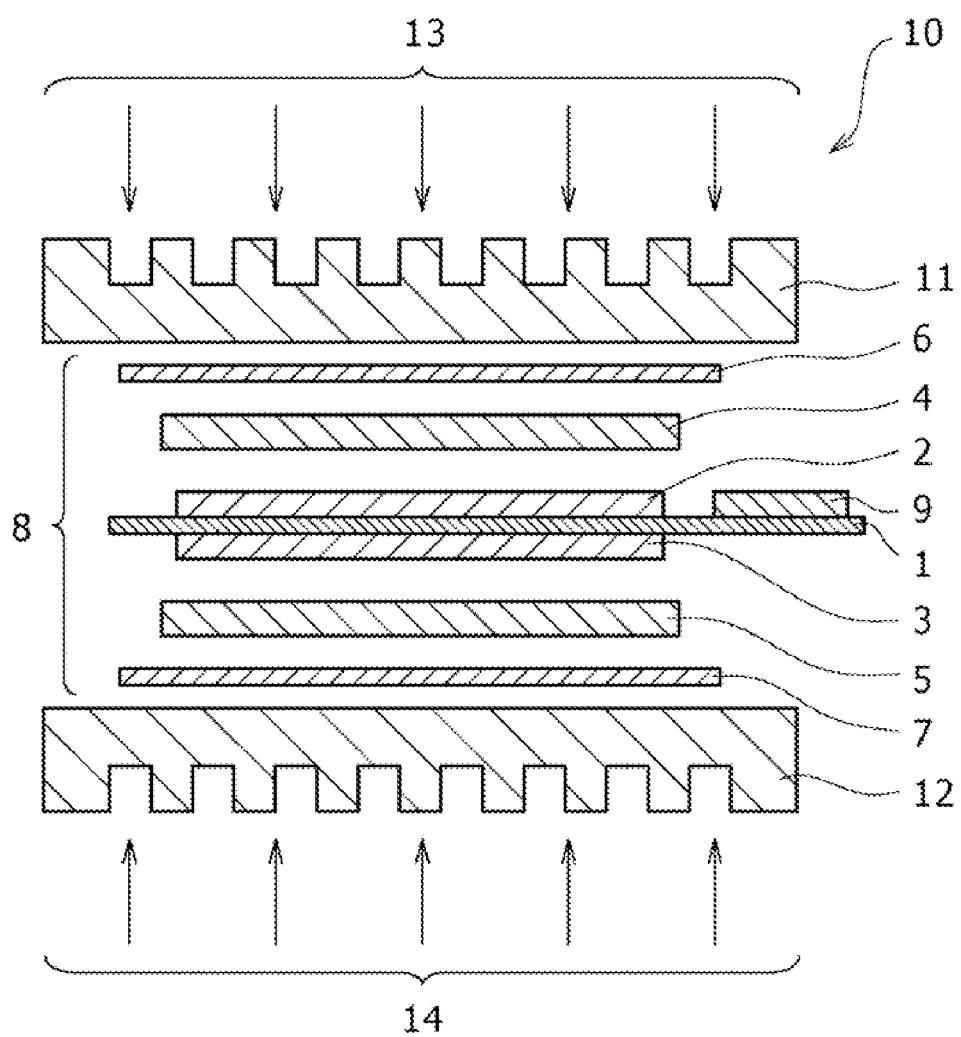
FIG. 2 is a diagram of assistance in explaining a constitution of the electrochemical energy generating apparatus based on the embodiment of the present invention.

FIG. 2 is a sectional view of a fuel cell 10, which is the electrochemical device unit forming the electrochemical energy generating apparatus based on the present embodiment. However, in FIG. 2, the fuel cell 10 is shown in a state of being disassembled for easy viewing. FIG. 1 is a sectional view of an assembled fuel cell 10.

As shown in FIG. 2, in the fuel cell 10, with an electrolyte membrane 1 as the electrolyte at a center, catalyst layers (an anode side catalyst layer 2 and a cathode side catalyst layer 3), diffusion layers (an anode side diffusion layer 4 and a cathode side diffusion layer 5), and an anode 6 and a cathode 7 (an anode side collector 6 and a cathode side collector 7) are arranged on both sides of the electrolyte membrane 1. These parts are integrated to form an MEA (Membrane Electrode Assembly structure) 8.

Materials forming the MEA 8 are not particularly limited, and suitable materials can be selected appropriately from publicly known materials, and used. For example, as the electrolyte membrane 1, a proton-conducting membrane such as a perfluorosulfonic acid resin (for example Nafion (registered trademark) manufactured by DuPont) or the like can be used. As a catalyst forming the anode side catalyst layer 2 and the cathode side catalyst layer 3, simple substances such as palladium (Pd), platinum (Pt), iridium (Ir), rhodium (Rh), ruthenium (Ru) and the like or alloys of these metals, for example, can be used. The anode side diffusion layer 4 and the cathode side diffusion layer 5 are preferably formed by a carbon cloth, a carbon paper, or a carbon sheet, and subjected to water-repelling treatment by polytetrafluoroethylene (PTFE) or the like.

A fuel 13 is introduced into the anode 6 via a fuel supply part 11, and an air (or oxygen) 14 is introduced into the cathode 7 via an air supply part 12.

The fuel cell 10 as the electrochemical device unit according to the present invention is characterized by including a reference electrode 9 maintained at an oxidation-reduction potential between a metal and a metal ion, the reference electrode 9 being in contact with or in proximity to the electrolyte membrane 1. A material for the reference electrode 9 is not particularly limited. However, a reference electrode formed by silver and a silver chloride layer formed on the surface of the silver in which a reversible oxidation-reduction reaction between a metal and a metal ion is expressed by the following equation is preferably used because of a low cost of the reference electrode.

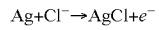

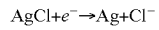

Because the reference electrode 9 is disposed in contact with or in proximity to the electrolyte membrane 1, an electrolyte (for example AgCl) including a metal ion of the reference electrode 9 is maintained at the same potential as the electrolyte membrane 1 of the fuel cell 10, and the reference electrode 9 can be used as a reference for measuring the potentials of the anode 6 and the cathode 7.

The reference electrode 9 may be fixed on the electrolyte membrane 1 on the anode 6 side, or on the electrolyte membrane 1 on the cathode 7 side. In addition, a plurality of reference electrodes 9 may be provided. When the electrolyte membrane 1 is humidified, a position at which the reference electrode 9 is fixed is not limited. The stability of the reference electrode 9, which is not a reversible hydrogen electrode, depends on humidity. Hence, the reference electrode 9 is preferably fixed in the vicinity of the electrode (within 1 mm to 10 mm of the electrode) that water passes in reaction and is thus always humidified.

Because the reference electrode 9 is based on an oxidation-reduction potential between a metal and a metal ion, and a gas diffusion electrode is not used as the reference electrode 9, a problem associated with gas supply as described above does not occur. That is, unlike the fuel cell according to Patent Document 1 (Japanese Patent No. 3451111), a fuel for the fuel cell is not fed into the gas diffusion electrode, and thus the potential of the reference electrode 9 is not dependent on the concentration or the type of the fuel for the fuel cell. In addition, unlike a fuel cell control system according to Patent Document 2 (Japanese Patent Laid-Open No. 2001-338667), the reversible hydrogen electrode is not used, and thus a problem of a device being increased in size, complexity, and cost to supply a hydrogen gas does not occur. Thus, the fuel cell 10 is suitable as a small fuel cell such as a fuel cell for a mobile device, for example.

Although the reference electrode 9 is of a very simple structure, the potentials of the anode 6 and the cathode 7 with respect to the reference electrode 9 can be obtained as real-time data during operation. A combination of the measurement data and a control algorithm to be described later enables a cause of a degradation in performance of the fuel cell 10 to be grasped instantly. Thus, even when the internal characteristics of the fuel cell 10 are varied greatly, the fuel cell 10 can be operated with a high power generation characteristic.

FIG. 1 is a diagram of assistance in explaining a constitution of an electrochemical energy generating apparatus 50 based on the present embodiment. The electrochemical energy generating apparatus 50 includes: a fuel cell 10 for converting a part of chemical energy possessed by a fuel into electric energy; a measuring unit 30 for measuring an operating state of the fuel cell 10; a control unit 40 for determining an operating condition on the basis of a result of the measurement; and a fuel supply quantity setting unit 20 for setting a fuel supply quantity as the operating condition of the fuel cell 10 on the basis of the determination.

The electrochemical energy generating apparatus 50 measures the potentials of an anode 6 and a cathode 7 with respect to a reference electrode 9 during the operation of the fuel cell 10, and controls the fuel supply quantity as the operating condition of the fuel cell 10 on the basis of a combination of a result of the measurements and a result of measurements of the output current and the output voltage of the fuel cell 10. At this time, the setting of the fuel supply quantity is made repeatedly, and thereby a fuel concentration at the anode 6 is optimized so as to follow a variation in characteristics of the fuel cell 10.

In the fuel supply quantity setting unit 20, a raw fuel 21 is stored within fuel storing means 22, and the fuel supply quantity supplied to the fuel cell 10 is set by fuel supply quantity setting means 23. It suffices for the fuel supply quantity setting means 23 to be able to be driven by a signal from the control unit 40, and the fuel supply quantity setting means 23 is not particularly limited. However, for example, the fuel supply quantity setting means 23 is preferably formed by a shutter or a valve driven by a motor or a piezoelectric element, an electromagnetic pump, or the like.

The raw fuel 21 is methanol in liquid form or gaseous form. The raw fuel 21 is stored in a tank or a cartridge as the fuel storing means 22 before being supplied to the fuel cell 10. The fuel supply quantity setting means 23 driven by a signal from the control unit 40 sets the raw fuel 21 to the fuel supply quantity determined in the control unit 40, and thereafter the raw fuel 21 is supplied as a fuel 13 to the anode 6 side of the fuel cell 10.

During power generation, the fuel 13 such as methanol in liquid form or gaseous form or the like is supplied to the anode 6 side, and is oxidized to carbon dioxide in an anode side catalyst layer. Protons generated at this time travel through an electrolyte membrane separating the anode and the cathode to the cathode, and then react with oxygen to form water on the cathode side. Reactions occurring at the anode, the cathode, and the DMFC as a whole at this time are expressed by the following equation. A part of chemical energy of methanol is converted into electric energy, and current is extracted from the fuel cell 10.

Anode: $CH_3OH+H_2O \rightarrow CO_2+6e^-+6H^+$

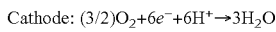

Cathode: $(3/2)O_2+6e^-+6H^+ \rightarrow 3H_2O$

DMFC as a whole: $CH_3OH+(3/2)O_2 \rightarrow CO_2+2H_2O$

In the present embodiment, description is made of an example in which the raw fuel 21 is methanol. However, the fuel is not particularly limited. Hydrogen, alcohols other than methanol, hydrocarbons and the like can be used as the fuel. The raw fuel 21 may be in a gaseous state, a liquid state, or a solid state.

The measuring unit 30 includes: a voltage measuring circuit 31 for measuring the potentials of the anode 6 and the cathode 7 with respect to the reference electrode 9 and the output voltage of the fuel cell 10; and a current measuring circuit 32 for measuring the output current of the fuel cell 10. Measurement results obtained by these measuring means are transmitted to a communication unit 43 in the control unit 40 via a communication line 33 during operation.

As the control unit 40, a microcomputer, for example, can be used. The control unit 40 calculates average values of the anode potential, the cathode potential, and the output voltage and the output current of the fuel cell 10, which are sampled at fixed intervals, from the measurement results transmitted from the measuring unit 30. The control unit 40 controls the fuel supply quantity setting unit 20 on the basis of the calculated values.

More specifically, the control unit 40 includes an operation unit 41, a storage unit 42, a communication unit 43 and the like. The communication unit 43 has a function of receiving the data from the measuring unit 30 and inputting the data to the storage unit 42, a function of outputting a signal for setting the fuel supply quantity to the fuel supply quantity setting means 23 via a communication line 44, and the like. The storage unit 42 stores various measured values from the measuring unit 30 which values are received by the communication unit 43, various average values calculated by the operation unit 41, and the like. The operation unit 41 averages the anode potential, the cathode potential, and the output voltage and the output current of the fuel cell, which are sampled at fixed intervals, from the various measurement results input to the storage unit 42, and thereby calculates an average anode potential, an average cathode potential, an average output voltage, and an average output current. A comparison operation unit compares various average values stored in the storage unit 42 with each other, and determines an excess or a deficiency of the fuel supply quantity.

An external circuit 60 (load) represents a mobile device (a portable telephone, a PDA (Personal Digital Assistant: a personal portable information device), or the like), and is driven by electric energy generated by the fuel cell 10.

Description will next be made of an operating method of the electrochemical energy generating apparatus based on the present embodiment. While a control algorithm is dependent on an operating method in which the fuel cell is operated in a constant voltage output mode or operated in a constant current output mode, it is the use of the reference electrode that makes it possible to deal with causes of degradation in performance such as a fuel deficiency, an air deficiency, a crossover and the like even with different operating methods. In addition, even a system in which the constant voltage output mode and the constant current output mode are mixed can deal with causes of degradation in performance flexibly by using the reference electrode.

Figure 3:
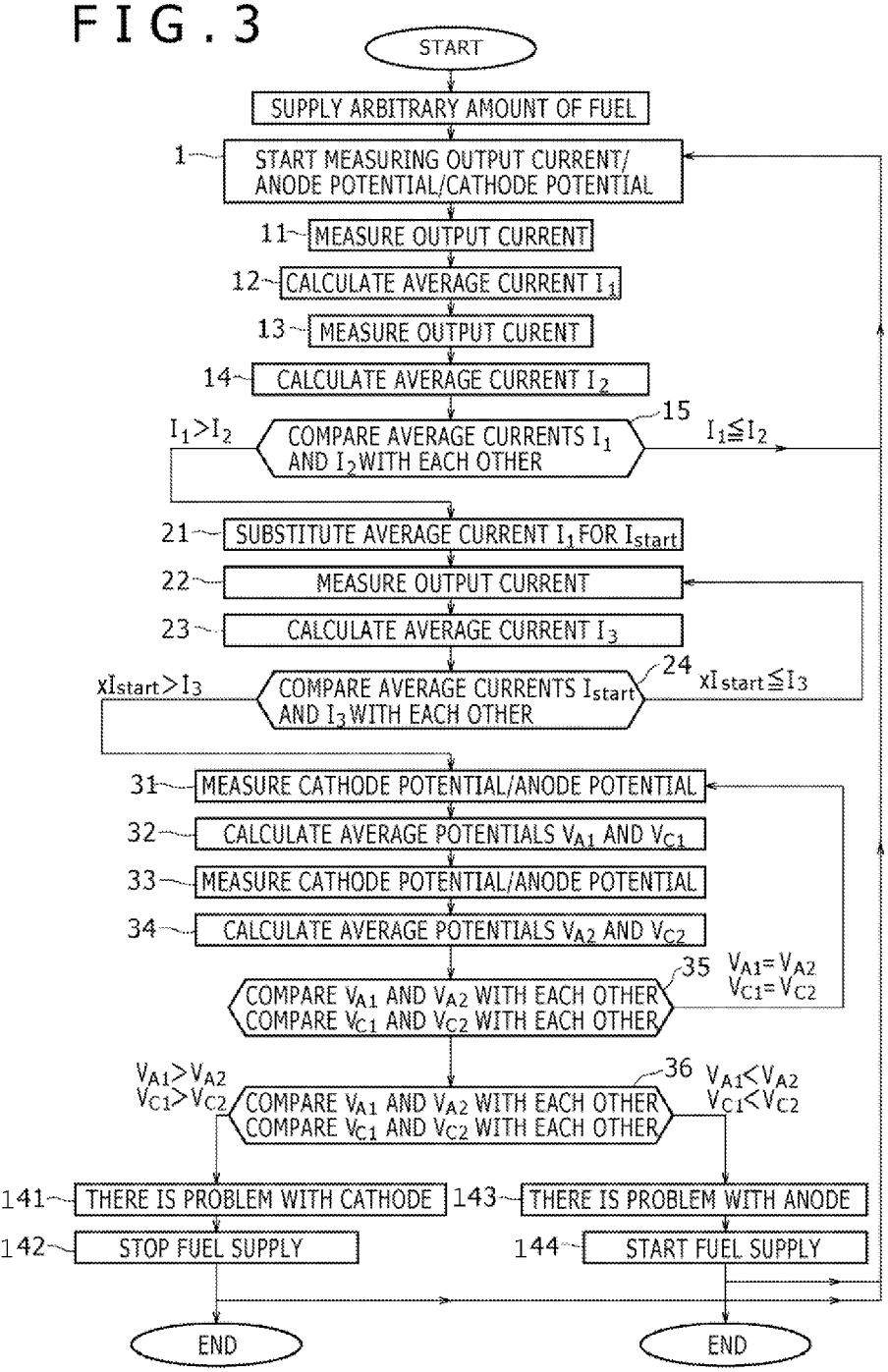
FIG. 3 is a flowchart of an example of an operating method of an electrochemical energy generating apparatus when operated in a voltage output mode based on an embodiment of the present invention.

FIG. 3 is a flowchart representing an example of an operating method of the electrochemical energy generating apparatus when operated in the constant voltage output mode. A control algorithm for optimizing the power generation characteristic at all times when the fuel cell 10 is operated to output a constant output voltage will be described in the following with reference to FIG. 3.

As shown in step 1, control begins immediately after the operation of the fuel cell 10 is started. That is, the measuring unit 30 starts measuring the output current of the fuel cell 10 in operation as well as the potential of the anode 6 and the potential of the cathode 7 with respect to the reference electrode 9.

First, as shown in step 11, the current measuring circuit 32 measures the output current according to a command from the control unit 40. Though a sampling rate and the number of samplings are not particularly limited, it is desirable to collect data at a sampling rate of $1/10$ seconds, for example, with 50 samplings as one set, and store the data in the storage unit 42 within the control unit 40 via the communication line 33. When the sampling rate is too fast, an SN ratio is degraded, whereas when the sampling rate is too slow, the response speed of the control system is lowered. It is thus desirable to set the sampling rate at about $1/10$ seconds.

Next, as shown in step 12, the operation unit 41 processes the data stored in the storage unit 42, thereby calculates an average current value $I_1$, and then stores the average current value $I_1$ in the storage unit 42.

Next, as shown in step 13, as in step 11, measurement data on the output current of the fuel cell 10 is collected again at a sampling rate of $1/10$ seconds with the number of samplings set at 50, and then stored in the storage unit 42. Then, as shown in step 14, as in step 12, an average current value $I_2$ is calculated and then stored in the storage unit 42.

Thereafter, as shown in step 15, the average current value $I_1$ and the average current value $I_2$ stored in the storage unit 42 are input to the comparison operation unit within the operation unit 41, where an intercomparison process is performed. When the average current value $I_2$ is higher than or equal to the average current value $I_1$, it is determined that the performance of the fuel cell is not degraded, and the average current value $I_1$ and the average current value $I_2$ are erased. The process returns to step 1 to start new measurement of the current value, the anode potential, and the cathode potential.

When the average current value $I_2$ is lower than the average current value $I_1$, it is determined that the performance of the fuel cell is degraded, and the process proceeds to step 21. In step 21, the average current value $I_1$ is substituted for $I_{start}$, and then the average current value $I_1$ and the average current value $I_2$ are cleared. The process proceeds to step 22. In step 22, as in step 11, measurement data on the output current of the fuel cell 10 is collected again and then stored in the storage unit 42. As shown in step 23, as in step 12, an average current value $I_3$ is calculated and then stored in the storage unit 42.

Thereafter, as shown in step 24, the average current value $I_{start}$ and the average current value $I_3$ stored in the storage unit 42 are input to the comparison operation unit within the operation unit 41, where an intercomparison process is performed. At this time, a number x for setting an allowable amount of change in the value of the output current is determined in advance. While the value of x may be any value in a range $0<x\leq1$, it is desirable to set the value of x at a value close to one when a process for preventing a substantial change in the value of the output current is desired to be performed before the substantial change in the value of the output current is observed. When a setting is made such that x=0.6, for example, and when the average current value $I_3$ becomes lower than 60 percent of the average current value $I_{start}$, the process for preventing the change in the value of the output current is performed.

That is, in the process of step 24, when the average current value $I_3$ is higher than or equal to a value obtained by multiplying the average current value $I_{start}$ by x, it is determined that the process for preventing the change in the output current is not necessary yet, and the value $I_3$ is cleared. The process returns to step 22 to perform current measurement and then calculate the average current value $I_3$ again.

On the other hand, in the process of step 24, when the average current value $I_3$ is lower than the value obtained by multiplying the average current value $I_{start}$ by x, it is determined that the process for preventing the change in the output current is necessary, and the process proceeds to step 31. In step 31, the voltage measuring circuit 31 measures the potentials of the anode 6 and the cathode 7 with respect to the reference electrode 9 at an appropriate sampling rate and with an appropriate number of samplings. Data obtained is stored in the storage unit 42 within the control unit 40 via the communication line 33.

Next, in step 32, the operation unit 41 processes the data on the anode potential and the cathode potential which data is stored in the storage unit 42 to calculate an average anode potential $V_{A1}$ and an average cathode potential $V_{C1}$. The average anode potential $V_{A1}$ and the average cathode potential $V_{C1}$ are stored in the storage unit 42.

Next, as shown in step 33, as in step 31, the potentials of the anode 6 and the cathode 7 are measured again, and data obtained is stored in the storage unit 42 within the control unit 40. Then, as shown in step 34, as in step 32, an average anode potential $V_{A2}$ and an average cathode potential $V_{C2}$ are calculated and then stored in the storage unit 42.

Thereafter, as shown in steps 35 and 36, the average anode potential $V_{A1}$ and the average anode potential $V_{A2}$ and the average cathode potential $V_{C1}$ and the average cathode potential $V_{C2}$ are input to the comparison operation unit within the operation unit 41, where an intercomparison process is performed. In a case of operation in the constant voltage output mode, the cathode potential shifts in the same direction that the anode potential shifts, and vice versa. Therefore similar control is possible even with a comparison of only the anode potentials or a comparison of only the cathode potentials. It is to be noted, however, that control to be described next is not possible without the reference electrode 9.

When the intercomparison of step 35 shows that the average anode potential $V_{A1}$ and the average anode potential $V_{A2}$ are equal to each other or that the average cathode potential $V_{C1}$ and the average cathode potential $V_{C2}$ are equal to each other, the process returns to step 31 to check the anode potential and the cathode potential again. Otherwise, the process proceeds to next step 36.

When the intercomparison of step 36 shows that the average anode potential $V_{A1}$ is higher than the average anode potential $V_{A2}$ or that the average cathode potential $V_{C1}$ is higher than the average cathode potential $V_{C2}$, it is determined that there is a problem on the cathode side, and the process proceeds to step 141. A possible cause of the problem on the cathode side is an air deficiency or the presence of an excessive amount of fuel, which causes fuel crossover from the anode side to the cathode side. Hence, in such a case, a command to stop fuel supply is transmitted from the communication unit 43 within the control unit 40 to the fuel supply quantity setting unit 20 via the communication line 44, and the fuel supply quantity setting means 23 stops fuel supply in step 142. Thereafter the process returns to step 1 to start monitoring the output current of the fuel cell 10 in operation again.

When the intercomparison of step 36 shows that the average anode potential $V_{A1}$ is lower than the average anode potential $V_{A2}$ or that the average cathode potential $V_{C1}$ is lower than the average cathode potential $V_{C2}$, it is determined that there is a problem on the anode side, and the process proceeds to step 143. A possible cause of the problem on the anode side is a decrease in fuel concentration due to a deficiency of the fuel supply quantity. Hence, in such a case, a command to supply a fuel is transmitted from the communication unit 43 within the control unit 40 to the fuel supply quantity setting unit 20 via the communication line 44, and the fuel supply quantity setting means 23 starts fuel supply in step 144. Thereafter the process returns to step 1 to start monitoring the output current of the fuel cell 10 in operation again.

Figure 4:
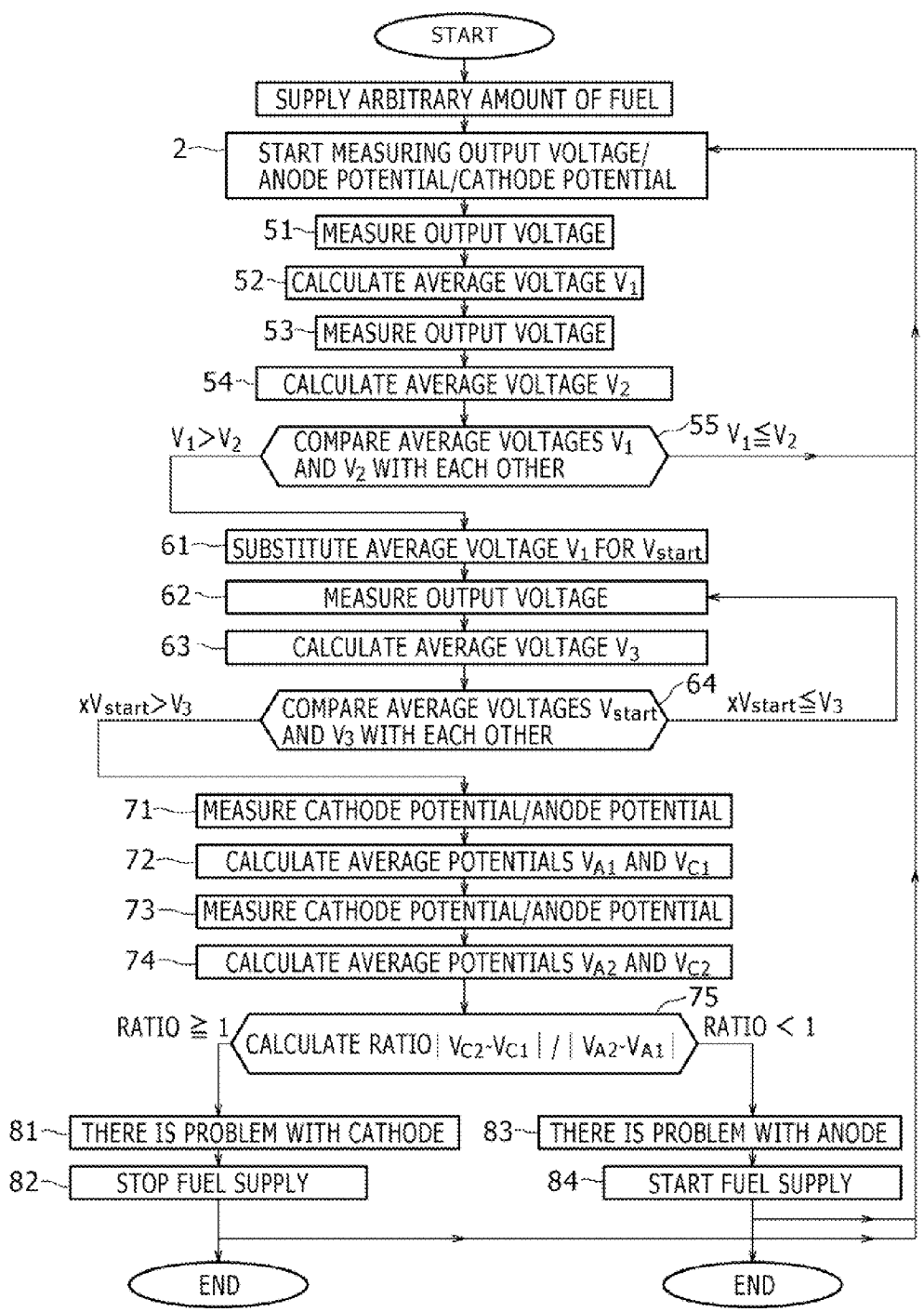
FIG. 4 is a flowchart of an example of an operating method of an electrochemical energy generating apparatus when operated in a constant current output mode based on an embodiment of the present invention.

FIG. 4 is a flowchart representing an example of an operating method of the electrochemical energy generating apparatus when operated in the constant current output mode. A control algorithm for optimizing the power generation characteristic at all times when the fuel cell 10 is operated to output a constant output current will be described in the following with reference to FIG. 4.

As shown in step 2, control begins immediately after the operation of the fuel cell 10 is started. That is, the measuring unit 30 starts measuring the output voltage of the fuel cell 10 in operation as well as the potential of the anode 6 and the potential of the cathode 7 with respect to the reference electrode 9.

First, as shown in step 51, the voltage measuring circuit 31 measures the output voltage according to a command from the control unit 40. It suffices to select a sampling rate and the number of samplings appropriately, and the sampling rate and the number of samplings are not particularly limited. However, as already described, it is desirable to collect data at a sampling rate of 1/10 seconds, for example, with 50 samplings as one set, and store the data in the storage unit 42 within the control unit 40 via the communication line 33.

Next, as shown in step 52, the operation unit 41 processes the data stored in the storage unit 42, thereby calculates an average voltage value $V_1$, and then stores the average voltage value $V_1$ in the storage unit 42.

Next, as shown in step 53, as in step 51, measurement data on the output voltage of the fuel cell 10 is collected again at a sampling rate of 1/10 seconds with the number of samplings set at 50, and then stored in the storage unit 42. Then, as shown in step 54, as in step 52, an average voltage value $V_2$ is calculated and then stored in the storage unit 42.

Thereafter, as shown in step 55, the average voltage value $V_1$ and the average voltage value $V_2$ stored in the storage unit 42 are input to the comparison operation unit within the operation unit 41, where an intercomparison process is performed. When the average voltage value $V_2$ is higher than or equal to the average voltage value $V_1$, it is determined that the performance of the fuel cell is not degraded, and the average voltage value $V_1$ and the average voltage value $V_2$ are erased. The process returns to step 2 to start new measurement of the output voltage, the anode potential, and the cathode potential.

If the average voltage value $V_2$ is lower than the average voltage value $V_1$, it is determined that the performance of the fuel cell is degraded, and the process proceeds to step 61. In step 61, the average voltage value $V_1$ is substituted for $V_{start}$, and then the average voltage value $V_1$ and the average voltage value $V_2$ are cleared. The process proceeds to step 62. In step 62, as in step 51, measurement data on the output voltage of the fuel cell 10 is collected again and then stored in the storage unit 42. As shown in step 63, as in step 52, an average voltage value $V_3$ is calculated and then stored in the storage unit 42.

Thereafter, as shown in step 64, the average voltage value $V_{start}$ and the average voltage value $V_3$ stored in the storage unit 42 are input to the comparison operation unit within the operation unit 41, where an intercomparison process is performed. At this time, a number x for setting an allowable amount of change in the value of the output voltage is determined in advance. While the value of x may be any value in a range $0 < x \leq 1$, it is desirable to set the value of x at a value close to one when a process for preventing a substantial change in the value of the output voltage is desired to be performed before the substantial change in the value of the output voltage is observed. When a setting is made such that x=0.6, for example, and when the average voltage value $V_3$ becomes lower than 60 percent of the average voltage value $V_{start}$, the process for preventing the change in the value of the output current is performed.

That is, in the process of step 64, when the average voltage value $V_3$ is higher than or equal to a value obtained by multiplying the average voltage value $V_{start}$ by x, it is determined that the process for preventing the change in the output voltage is not necessary yet, and the value $V_3$ is cleared. The process returns to step 62 to perform current measurement and then calculate the average current value $I_3$ again.

On the other hand, in the process of step 64, when the average voltage value $V_3$ is lower than the value obtained by multiplying the average voltage value $V_{start}$ by x, it is determined that the process for preventing the change in the output voltage is necessary, and the process proceeds to step 71. In step 71, the voltage measuring circuit 31 measures the potentials of the anode 6 and the cathode 7 with respect to the reference electrode 9 at an appropriate sampling rate and with an appropriate number of samplings. Data obtained is stored in the storage unit 42 within the control unit 40 via the communication line 33.

Next, in step 72, the operation unit 41 processes the data on the anode potential and the cathode potential which data is stored in the storage unit 42 to calculate an average anode potential $V_{A1}$ and an average cathode potential $V_{C1}$. The average anode potential $V_{A1}$ and the average cathode potential $V_{C1}$ are stored in the storage unit 42.

Next, as shown in step 73, as in step 71, the potentials of the anode 6 and the cathode 7 are measured again, and data obtained is stored in the storage unit 42 within the control unit 40. Then, as shown in step 74, as in step 72, an average anode potential $V_{A2}$ and an average cathode potential $V_{C2}$ are calculated and then stored in the storage unit 42.

Thereafter, as shown in step 75, the average anode potential $V_{A1}$ and the average anode potential $V_{A2}$ and the average cathode potential $V_{C1}$ and the average cathode potential $V_{C2}$ stored in the storage unit 42 are each processed by the operation unit 41 to obtain an absolute value $|V_{C2}-V_{C1}|$ and an absolute value $|V_{A2}-V_{A1}|$ and calculate a ratio $|V_{C2}-V_{C1}|/|V_{A2}-V_{A1}|$. Next, as shown in step 76, the above ratio is input to the comparison operation unit within the operation unit 41, where a process of magnitude comparison between the ratio and one is performed.

When the ratio is equal to or higher than one, it is determined that there is a problem on the cathode side, and the process proceeds to step 81. A possible cause of the problem on the cathode side is an air deficiency or occurrence of fuel crossover from the anode side to the cathode side. Hence, in such a case, a command to stop fuel supply is transmitted from the communication unit 43 within the control unit 40 to the fuel supply quantity setting unit 20 via the communication line 44, and the fuel supply quantity setting means 23 stops fuel supply in step 82. Thereafter the process returns to step 2 to start monitoring the output voltage of the fuel cell 10 in operation again.

When the ratio is lower than one, it is determined that there is a problem on the anode side, and the process proceeds to step 83. A possible cause of the problem on the anode side is a decrease in fuel concentration due to a deficiency of the fuel supply quantity. Hence, in such a case, a command to supply a fuel is transmitted from the communication unit 43 within the control unit 40 to the fuel supply quantity setting unit 20 via the communication line 44, and the fuel supply quantity setting means 23 starts fuel supply in step 84. Thereafter the process returns to step 2 to start monitoring the output voltage of the fuel cell 10 in operation again.

As described above, according to the electrochemical energy generating apparatus based on the present embodiment and the operating method of the electrochemical energy generating apparatus, the conditions of the anode 6 and/or the cathode 7 can be monitored at all times while the fuel cell 10 as the electrochemical device unit is operated. Then, on the basis of the real-time data measured during operation, a cause of degradation in performance of the fuel cell 10 is determined, and the operating condition of the fuel cell 10 is set. It is therefore possible to deal with the cause instantly and appropriately. The setting of the operating condition is not derived from a predetermined rule, but is made on the basis of the conditions of the anode 6 and the cathode 7 being monitored in real time. Therefore, even when the internal characteristics of the fuel cell 10 change, it is possible to respond to the change immediately, and obtain a high power generation characteristic at all times.

Embodiments

The present invention will hereinafter be described in more detail on the basis of embodiments. However, it is needless to say that the present invention is not limited to the embodiments to be described below.

<Fabrication of Fuel Cell>

The fuel cell 10 shown in FIG. 2 was fabricated as the electrochemical device.

The anode side catalyst layer 2 was fabricated by mixing an alloy catalyst having a predetermined ratio of Pt to Ru with a Nafion dispersion solution in a predetermined ratio. The cathode side catalyst layer 3 was fabricated by mixing a catalyst having Pt supported on carbon with a Nafion dispersion solution in a predetermined ratio.

An electrolyte membrane 1 (produced by DuPont; Nafion NRE211 (registered trademark)) was interposed between the anode side catalyst layer 2 and the cathode side catalyst layer 3 fabricated by the above-described methods, and was subjected to thermocompression bonding for 10 minutes under conditions of a temperature of 150 degrees and a pressure of 249 kPa.

The electrolyte membrane 1 to which the anode side catalyst layer 2 and the cathode side catalyst layer 3 are bonded to each other by compression bonding was interposed between carbon papers (produced by Toray Industries, Inc.; product name of HGP-H-090), which correspond to the anode side diffusion layer 4 and the cathode side diffusion layer 5, and titanium meshes, which correspond to the anode (anode side collector) 6 and the cathode (cathode side collector) 7. These components were integrated with each other, whereby MEA8 was fabricated.

In further fabricating the reference electrode 9, a silver (Ag) ribbon of 0.10 mm×2.0 mm (produced by The Nilaco Corporation, AG-400325) and silver chloride (AgCl) (produced by Wako Pure Chemical Industries, Ltd., 192-00752 Silver Chloride; a purity of 99.5) were used. At this time, AgCl was heated to be fused in a range of 500° C. to 900° C. in an electric furnace, and the Ag ribbon was immersed therein, whereby a AgCl layer was made to adhere to the surface of the Ag ribbon. While the present embodiment uses the Ag ribbon and AgCl as materials for the reference electrode 9, it is needless to say that the reference electrode 9 is not limited to these materials.

The Ag/AgCl reference electrode 9 made by the above-described method was fixed to the Nafion membrane as the electrolyte membrane 1 on the anode side (2 mm from the electrode). Thereby the fuel cell 10 having the structure of FIG. 2 was fabricated. By fixing the reference electrode 9 on the electrolyte membrane 1, the potential of the anode 6 and the potential of the cathode 7 can be measured individually.

<Fabrication of Electrochemical Energy Generating Apparatus>

The above-described fuel cell 10 was incorporated into the electrochemical energy generating apparatus 50 shown in FIG. 1, connected to an electrochemical measuring device (produced by Solartron, MultiStat 1480), and operated in the constant voltage output (0.3 V) mode or the constant current output (100 mA) mode. A fuel deficiency detection, an air deficiency detection, and a fuel crossover detection were performed.

In the fuel supply quantity setting unit 20, a microsyringe pump (produced by kdScientific Inc.) was used as the fuel supply quantity setting means 23. An exit of a syringe (produced by Hamilton, 5000 µL) was directly connected to a fuel vaporizing chamber (not shown) adjacent to the anode 6. Methanol (a concentration of 99.8%) as the raw fuel 21 was supplied in such a manner as to be infiltrated from the exit into a filter paper located in the fuel vaporizing unit. The methanol infiltrated into the filter paper vaporizes naturally, and the vaporized methanol is supplied as the fuel 13 to the anode 6.

<Consideration of Characteristics of Electrochemical Energy Generating Apparatus>

In the following, principal causes of degradation in the power generation characteristic of the fuel cell are identified, and relations between these causes and the potentials of the anode and the cathode with respect to the reference electrode and the output voltage and the output current of the fuel cell are revealed by some model-like experiments. It is thereby possible to establish a method of performing proper control by using the reference electrode even under different operating conditions.

Figure 5:
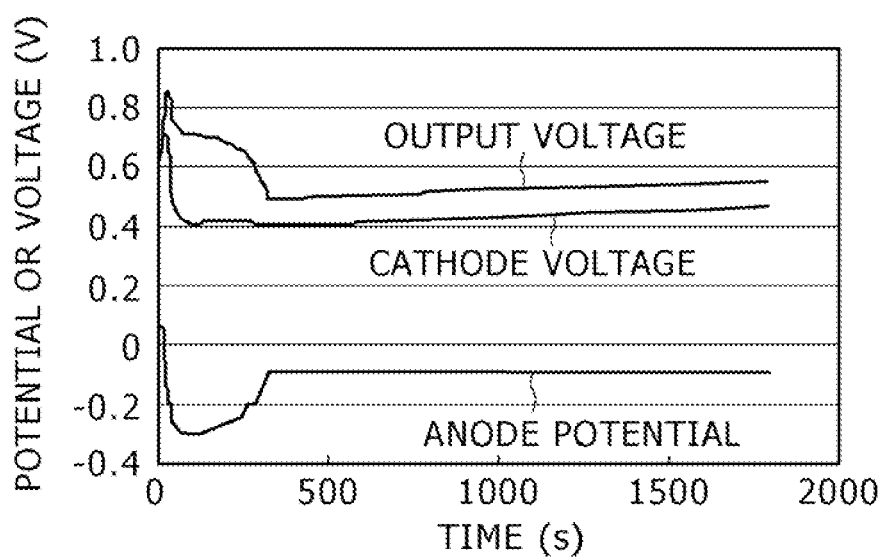
FIG. 5 is a graph showing changes with the passage of time in the potentials of an anode and a cathode and the output voltage of a fuel cell in the electrochemical energy generating apparatus according to the embodiment of the present invention in an initial stage of measurement.

FIG. 5 is a graph showing changes with the passage of time in the potentials of the anode and the cathode with respect to the reference electrode 9 and the output voltage of the fuel cell 10 in an initial stage of measurement of the electrochemical energy generating apparatus according to the present embodiment. It is shown that in a state of being retained for 30 minutes with open-circuit voltage, the anode potential and the cathode potential are stable.

Figure 6:
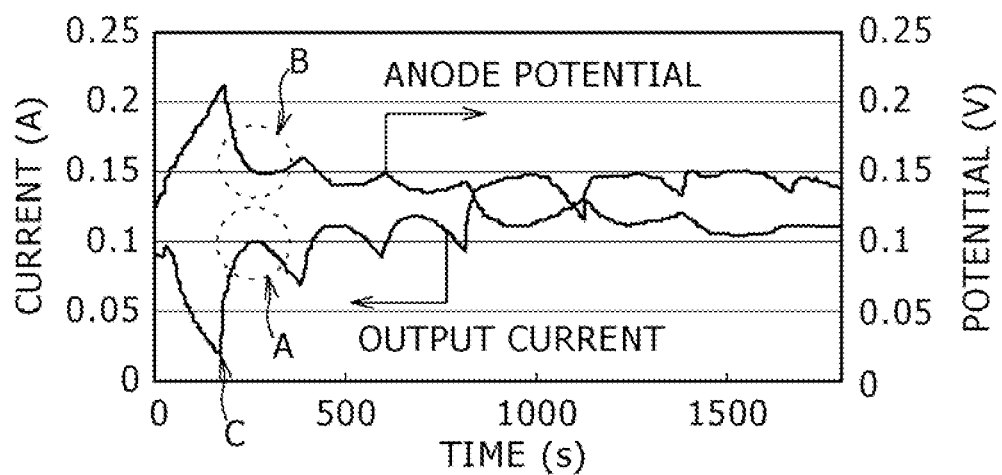
FIG. 6 is a graph showing changes in the anode potential and changes in output current which changes are caused by a fuel deficiency while the electrochemical energy generating apparatus according to the embodiment of the present invention is operating in a constant voltage output mode.

FIG. 6 is a graph showing changes in the anode potential and changes in the output current which changes are caused by a fuel deficiency while the fuel cell 10 operates in the constant voltage output mode in which the fuel cell 10 outputs a constant output voltage (0.3 V). In this experiment, 2-µL 100% methanol is supplied in a pulse-like manner at substantially fixed intervals (a point in time at which the output current exhibits a minimum, for example point C corresponds substantially to a point in time at which methanol is supplied).

As shown in FIG. 6, immediately after methanol is supplied, the output current starts increasing, and the anode potential starts decreasing. Thereafter, as shown in circle A and circle B, the output current exhibits a maximum value and the anode potential exhibits a minimum value, and then the output current starts decreasing and the anode potential starts rising. In consideration of the methanol supplying method, such changes are considered to correspond to an increase and a decrease in methanol concentration at the anode. That is, when the anode is supplied with a sufficient amount of methanol, the output current is held high and the anode potential is held low. On the other hand, when the power generation characteristic is degraded due to a deficiency in the fuel supply quantity supplied to the anode, the output current decreases and the anode potential rises. Hence, by detecting early this change such that "the output current starts decreasing and the anode potential starts rising" when a deficiency in the fuel supply quantity supplied to the anode starts to occur and performing a process of "increasing the fuel supply quantity supplied to the anode", it is possible to minimize a degradation in the power generation characteristic due to the deficiency in the fuel supply quantity supplied to the anode.

Figure 7:
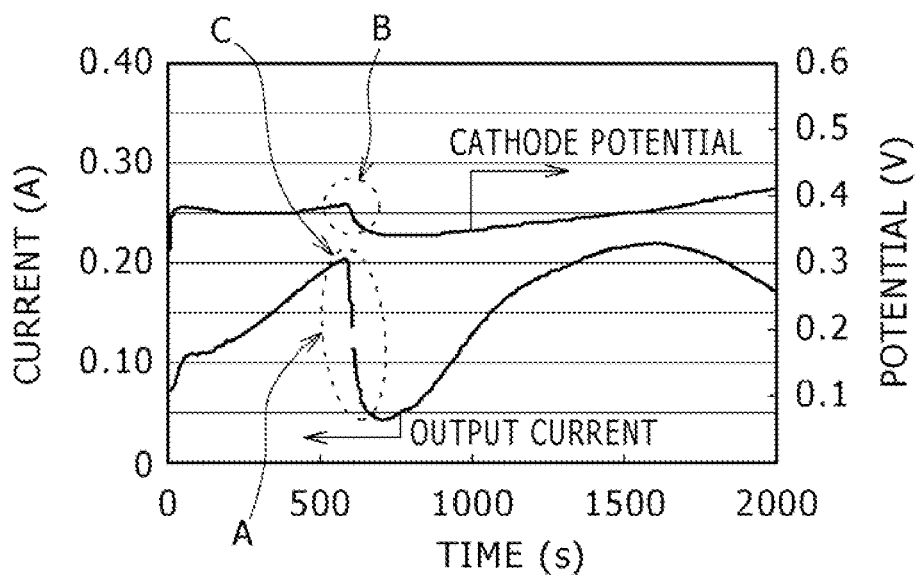
FIG. 7 is a graph showing changes in the cathode potential and the output current which changes occur when methanol crossover is made to occur while the electrochemical energy generating apparatus according to the embodiment of the present invention is operating in the constant voltage output mode.

FIG. 7 is a graph showing changes in the cathode potential and the output current which changes occur when methanol crossover is made to occur by intentionally supplying an excessive amount of methanol while the fuel cell 10 is operating in the constant voltage output mode in which the fuel cell 10 outputs a constant output voltage (0.3 V). A point in time indicated by C in FIG. 7 is a point in time at which the excessive amount of methanol is supplied. As shown in ellipse A and circle B, when the performance of the fuel cell is degraded due to methanol crossover, "the output current decreases and the cathode potential falls". Hence, by detecting early this change such that "the output current decreases and the cathode potential falls" when methanol crossover starts to occur and performing an appropriate process, it is possible to minimize a degradation in the power generation characteristic due to the methanol crossover.

Figure 8:
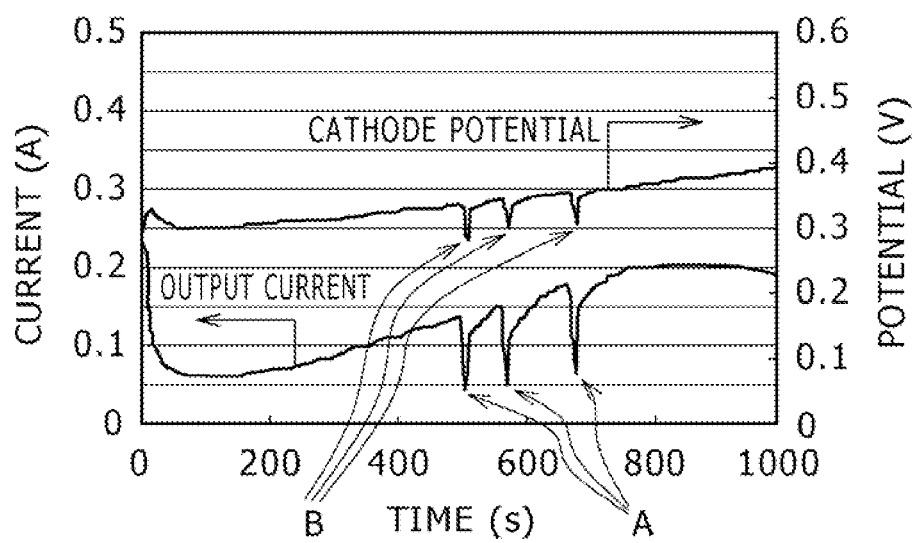
FIG. 8 is a graph showing changes in the cathode potential and the output current which changes occur when a state of an air deficiency is created while the electrochemical energy generating apparatus according to the embodiment of the present invention is operating in the constant voltage output mode.

FIG. 8 is a graph showing changes in the cathode potential and the output current which changes occur when a state of an air deficiency is created forcedly by sealing an air supply opening while the fuel cell 10 is operating in the constant voltage output mode in which the fuel cell 10 outputs a constant output voltage (0.3 V). Points in time at which spike-shaped drops indicated by A and B in the graph showing the output current and the cathode potential occur are points in time at which the air is interrupted. As shown in FIG. 8, when the performance of the fuel cell is degraded due to an air deficiency, "the output current decreases and the cathode potential falls". Hence, by detecting early this change such that "the output current decreases and the cathode potential falls" when an air deficiency starts to occur and performing an appropriate process, it is possible to minimize a degradation in the power generation characteristic due to the air deficiency.

Figure 9:
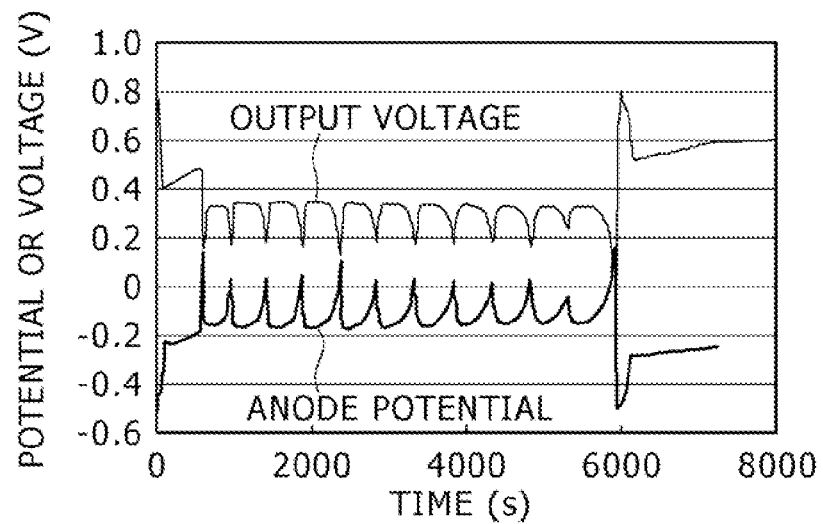
FIG. 9 is a graph showing changes in the anode potential and changes in output voltage which changes are caused by a fuel deficiency while the electrochemical energy generating apparatus according to the embodiment of the present invention is operating in the constant current output mode.

FIG. 9 is a graph showing changes in the anode potential and changes in the output voltage which changes are caused by a fuel deficiency while the fuel cell 10 operates in the constant current output mode in which the fuel cell 10 outputs a constant output current (100 mA). In this experiment, as in the case of the constant voltage output mode as illustrated in FIG. 6, methanol is supplied in a pulse-like manner at substantially fixed intervals (a point in time at which the output voltage exhibits a minimum corresponds substantially to a point in time at which methanol is supplied).

As shown in FIG. 9, immediately after methanol is supplied, the output voltage starts increasing sharply, and the anode potential starts decreasing sharply, as shown in a circle. Thereafter, the output voltage slowly exhibits a maximum value and the anode potential slowly exhibits a minimum value, and then the output current starts decreasing and the anode potential starts rising (the absolute value of an amount of change in the output voltage and the absolute value of an amount of change in the anode potential are substantially equal to each other, and an amount of increase in the anode potential is considered to directly become substantially an amount of decrease in the output voltage).

In consideration of the methanol supplying method, as in the case of the constant voltage output mode as illustrated in FIG. 6, such changes are considered to correspond to an increase and a decrease in methanol concentration at the anode. That is, when the anode is supplied with methanol of a sufficient concentration, the output voltage is held high and the anode potential is held low. On the other hand, when the power generation characteristic is degraded due to a deficiency in the fuel supply quantity supplied to the anode, the output voltage decreases and the anode potential rises. Hence, by detecting early this change such that "the anode potential starts rising" when a deficiency in the fuel supply quantity supplied to the anode starts to occur and performing a process of "increasing the fuel supply quantity supplied to the anode", it is possible to minimize a degradation in the power generation characteristic due to the deficiency in the fuel supply quantity supplied to the anode. Incidentally, in FIG. 7, fuel supply is stopped when about 6000 seconds has passed, and thus the characteristic is degraded. However, FIG. 7 proves that a fuel deficiency can be detected by the reference electrode, and that long-duration operation can be performed by performing fuel supply.

Figure 10:
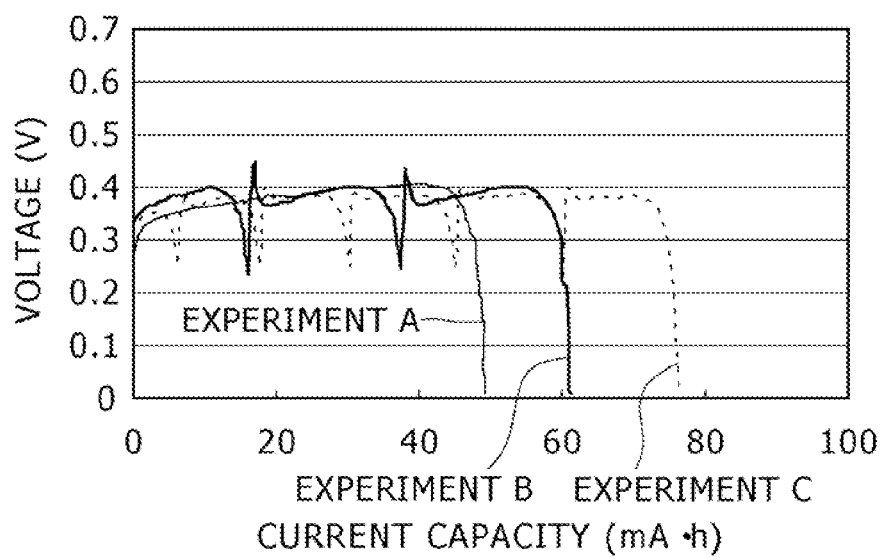
FIG. 10 is a graph showing results of experiments for examining effects of performing fuel supply a plurality of separate times when the electrochemical energy generating apparatus according to the embodiment of the present invention is operating in the constant current output mode.
Figure 11A:
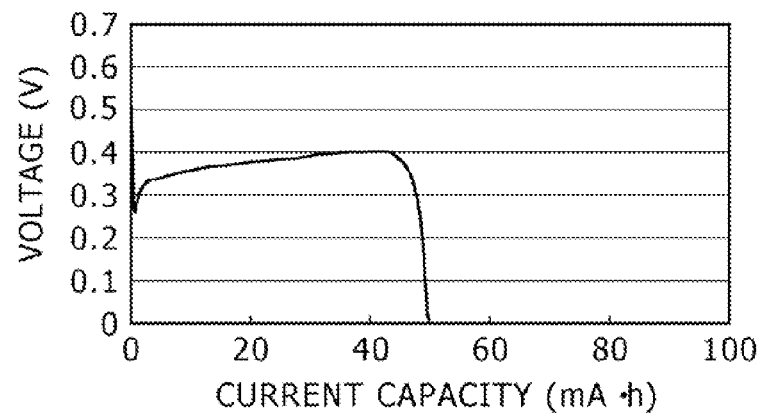
FIG. 11 is a graph showing the results of the experiments for examining effects of performing fuel supply a plurality of separate times when the electrochemical energy generating apparatus according to the embodiment of the present invention is operating in the constant current output mode.
Figure 11B:
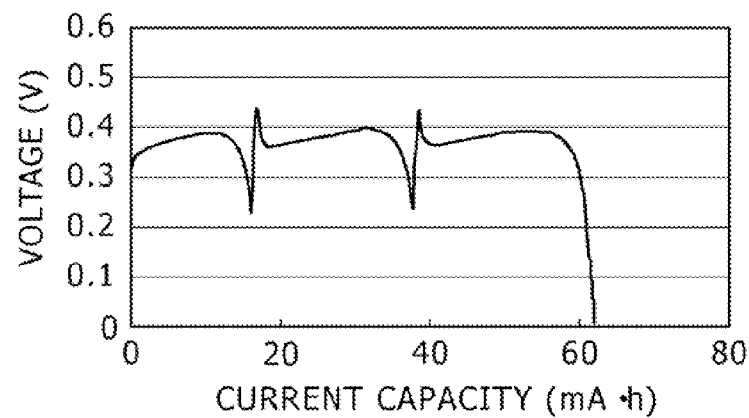
Figure 11C:
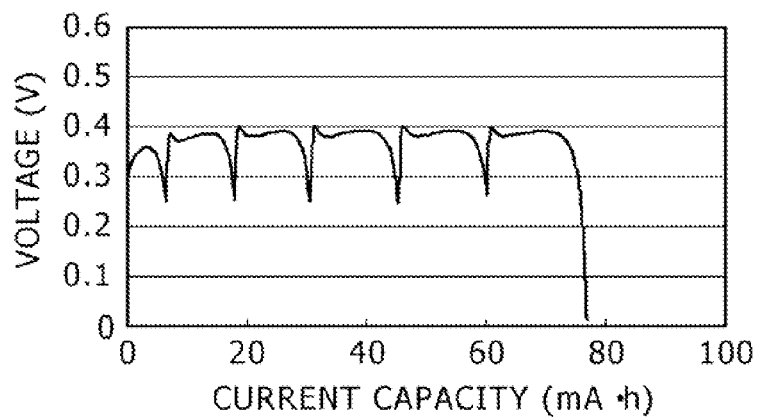

FIG. 10 and FIG. 11 show results of experiments for examining, on a model-like basis, effects of performing fuel supply a plurality of separate times when the fuel cell 10 operates in the constant current output mode in which the fuel cell 10 outputs a constant output current (100 mA). In experiment A, a 30 μL fuel was supplied at a time (FIG. 11(*a*)). In experiment B, a 30 μL fuel was divided and supplied three times (FIG. 11(*b*)). In experiment C, a 30 μL fuel was divided and supplied six times (FIG. 11(*c*)). In experiments B and C in which the fuel was divided and supplied a plurality of times, fuel supply was performed when a rise in the anode potential and a decrease in the output voltage, which are specific to a fuel deficiency, were detected using the reference electrode 9. In FIG. 10, the results of experiments A to C are combined into one for easy comparison.

As shown in FIG. 10, by detecting a fuel deficiency using the reference electrode, and supplying a small amount of fuel each time a fuel deficiency was detected, it was possible to improve power generation efficiency dramatically. Specifically, in experiment C, in which the fuel was divided and supplied six times, a current capacity 1.6 times that of experiment A, in which the fuel was supplied at a time, was obtained. The effect of actual control, which repeats the setting of the fuel supply quantity a far larger number of times than in experiment C, is improved more than in this example.

By monitoring the anode potential at all times using the reference electrode 9 and supplying a certain fuel as in FIG. 10 when a tendency for the anode potential to rise is detected, it is possible to maintain power generation. In addition, because methanol crossover can be detected by using the reference electrode 9, an optimum amount of fuel that does not cause methanol crossover can be supplied to the anode 6 side.

While the present invention has been described above on the basis of embodiments thereof and examples, the above-described examples can be modified in a variety of manners based on technical ideas of the present invention.

For example, in the electrochemical energy generating apparatus based on the present invention, the shape of the electrochemical device, materials therefor, and the like can be selected appropriately. In addition, the positions where the control unit, the measuring unit, the adjusting unit, the electrochemical device and the like forming the apparatus based on the present invention are placed, for example, are not particularly limited.

While in the above description of the present invention, a control method in the constant voltage output mode is taken as an example, the anode potential and the cathode potential can be measured using the reference electrode even in constant current output mode operation and in a mode in which the constant voltage output mode and the constant current output mode are mixed.

An operating method of an electrochemical energy generating apparatus according to the present invention is an operating method of an electrochemical energy generating apparatus, the electrochemical energy generating apparatus including an electrochemical device unit having an electrolyte disposed between an anode and a cathode, and a reference electrode disposed in contact with or in proximity to the electrolyte, the reference electrode being maintained at an oxidation-reduction potential between a metal and a metal ion, the operating method including: a step of measuring a potential of the anode and/or a potential of the cathode with respect to the reference electrode; a step of determining an operating condition of the electrochemical device unit on a basis of a result of measurement of the potentials of the anode and/or the cathode; and a step of setting the operating condition of the electrochemical device unit on a basis of the determination.

Thus, conditions of the anode and the cathode can be monitored at all times while the electrochemical device unit is operated. Then, on the basis of the real-time data measured during operation, a cause of degradation in performance of the electrochemical device unit is determined, and the operating condition of the electrochemical device unit is set. It is therefore possible to deal with the cause instantly and appropriately. The setting of the operating condition is not derived from a predetermined rule, but is made on the basis of the conditions of the anode and the cathode being monitored in real time. Therefore, even when the internal characteristics of the electrochemical device unit change, it is possible to respond to the change immediately, and obtain a high power generation characteristic at all times.

An electrochemical energy generating apparatus according to the present invention includes: an electrochemical device unit having an electrolyte disposed between an anode and a cathode; and a reference electrode disposed in contact with or in proximity to the electrolyte, the reference electrode being maintained at an oxidation-reduction potential between a metal and a metal ion. The electrochemical energy generating apparatus thus makes it possible to readily perform the operating method of the above-described electrochemical energy generating apparatus.

Specifically, in the electrochemical energy generating apparatus according to the present invention, the reference electrode is disposed in contact with or in proximity to the electrolyte. Thus, an electrolyte including the metal ion of the reference electrode is maintained at the same potential as the electrolyte of the electrochemical device unit, and the reference electrode can be used as a reference for measuring the potentials of the anode and the cathode.

In addition, because the reference electrode is based on an oxidation-reduction potential between a metal and a metal ion, gas supply is not necessary, and unlike a gas diffusion electrode, a problem associated with gas supply as described above does not occur. Consequently, although the reference electrode is of a very simple structure, the potentials of the anode and the cathode with respect to the reference electrode can be obtained as real-time data during operation, and a cause of a degradation in performance of the electrochemical device unit can be grasped instantly.

An electrochemical device according to the present invention is a member that can form a main part of the electrochemical energy generating apparatus according to the present invention.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A method of operating an electrochemical energy generating apparatus, said electrochemical energy generating apparatus including an electrochemical device unit having an electrolyte disposed between an anode and a cathode, and a reference electrode disposed in contact with or in proximity to said electrolyte, said reference electrode being maintained at an oxidation-reduction potential between a metal and a metal ion, said method comprising:
   (a) generating a first result by measuring, with respect to the reference electrode:
      (i) a potential of said anode; and
      (ii) a potential of said cathode;
   (b) generating a second result by directly measuring at least one:
      (i) an output of the electromechanical energy generating apparatus; and
      (ii) an output current of the electromechanical energy generating apparatus;
   (c) determining an operating condition of said electrochemical device unit based on a combination of:
      (i) the first result; and
      (ii) the second result; and
   (d) setting the operating condition of said electrochemical device unit based on the determined operating condition.

2. The method of claim 1, wherein the electrochemical device unit includes a fuel cell that supplies:
   (a) a fuel to said anode; and
   (b) an oxygen containing gas to said cathode.

3. The method of claim 2, wherein setting the operating condition includes setting a fuel supply quantity.

4. The method of claim 3, which includes:
   (a) repeatedly setting said fuel supply quantity; and
   (b) optimizing fuel concentration at said anode so as to follow a variation in characteristics of said fuel cell.

5. The method of claim 2, wherein the fuel is methanol in liquid or gaseous form.

6. The method of claim 1, wherein the reference electrode includes a silver layer and a silver chloride layer formed on a surface of the silver layer in which a reversible oxidation-reduction reaction between the metal and the metal ion takes place.

7. The method of claim 1, further comprising:
   measuring the output or the output current at a given sampling rate, and storing the measured values as first output data; and
   processing the first output data to determine a first average output value $I_1$.

8. The method of claim 7, further comprising:
   after determining the first average output value $I_1$, measuring the output or the output current at the given sampling rate, and storing the measured values as second output data; and
   processing the second output data to determine a second average output value $I_2$.

9. The method of claim 8, further comprising:
   comparing the first average output value $I_1$ to the second average output value $I_2$;
   if the second output value $I_2$ is greater than the first output value $I_1$, it is determined that performance of the electrochemical device unit is not degraded, and the first average current value $I_1$ and second average output value $I_2$ are deleted; and
   if the second output value $I_2$ is less than the first output value $I_1$, it is determined that the performance of the electrochemical device unit has degraded.

10. The method of claim 9, wherein if it is determined that the performance of the electrochemical device unit has degraded, the method further comprises:
   measuring the output or the output current at the given sampling rate, and storing the measured values as third output data;
   processing the third output data to determine a third average output value $I_3$;
   comparing the first average current value $I_1$ to the third average output value $I_3$; and
   if the third average output value $I_3$ is less than the first average output value $I_1$ by an amount exceeding a predetermined threshold, initiating a process for preventing a change in a value of output or output current.

11. The method of claim 10, wherein preventing the change in the value of output or output current includes:
measuring the potentials of the anode and the cathode at the given sampling rate with respect to the reference electrode;
storing the measurements first anode data and first cathode data, respsectively; and
processing the first anode data and the second anode data to determine a first average anode value $V_{A1}$ and a first average cathode value $V_{C1}$.

12. The method of claim 11, further comprising:
after determining the first average anode $V_{A1}$ and the first average cathode value $V_{C1}$, measuring the potentials of the anode and the cathode at the given sampling rate with respect to the reference electrode, and storing the measured values as second anode data and second cathode data, respectively; and
processing the second anode data and second anode data to determine a second average anode value $V_{A2}$ and a second average cathode value $V_{C2}$.

13. The method of claim 12, further comprising:
comparing the first average anode value $V_{A1}$ to the second average anode value $V_{A2}$, and comparing the first average cathode value $V_{C1}$ to the second average cathode value $V_{C2}$,
wherein:
if the first average anode potential $V_{A1}$ is equal to the second average anode potential $V_{A2}$, or if the first average cathode potential $V_{C1}$ is equal to the second average cathode potential $V_{C2}$, repeating measurements of the potential of the anode and the cathode for further comparisons,
if the first average anode potential $V_{A1}$ is greater than the second average anode potential $V_{A2}$, or if the first average cathode potential $V_{C1}$ is greater than the second average cathode potential $V_{C2}$, setting the operating condition by decreasing or stopping a fuel supply to the electrochemical device unit, and
if the first average anode potential $V_{A1}$ is less than the second average anode potential $V_{A2}$, or if the first average cathode potential $V_{C1}$ is less than the second average cathode potential $V_{C2}$, setting the operating condition by starting or increasing a fuel supply to the electrochemical device unit.

* * * * *